(12) United States Patent
Summers

(10) Patent No.: US 7,005,025 B2
(45) Date of Patent: Feb. 28, 2006

(54) WELDED ITEM

(75) Inventor: Wade Summers, Louisville, KY (US)

(73) Assignee: TBDC, LLC, Crestwood, KY (US)

( * ) Notice: Subject to any disclaimer, the term of this patent is extended or adjusted under 35 U.S.C. 154(b) by 57 days.

(21) Appl. No.: 10/600,204

(22) Filed: Jun. 20, 2003

(65) Prior Publication Data

US 2005/0247395 A1  Nov. 10, 2005

Related U.S. Application Data

(63) Continuation-in-part of application No. 09/879,709, filed on Jun. 12, 2001.

(60) Provisional application No. 60/215,256, filed on Jun. 30, 2000.

(51) Int. Cl.
 *B32B 31/20* (2006.01)
 *B29C 67/00* (2006.01)

(52) U.S. Cl. ............ 156/156; 156/244.17; 156/244.22; 156/245; 156/273.7; 156/275.1; 156/292; 156/308.4; 156/309.6; 264/191

(58) Field of Classification Search ................ 156/156, 156/242, 244.17, 244.22, 245, 272.2, 273.7, 156/275.1, 292, 308.2, 308.4, 309.6; 425/174, 425/408, 395, 233; 264/449, 491, 523, 524, 264/319, 325, 326; 473/609, 610, 611
See application file for complete search history.

(56) References Cited

U.S. PATENT DOCUMENTS

| | | | |
|---|---|---|---|
| 442,393 A | 12/1890 | Richwine | |
| 459,614 A | 9/1891 | Richwine | |
| 475,785 A | 5/1892 | Mason | |
| 492,280 A | 2/1893 | Fisher | |
| 584,498 A | 6/1897 | Ettinger | |
| 601,055 A | 3/1898 | Greaves | |
| 857,281 A | 6/1907 | Hogben | |
| 912,917 A | 2/1909 | Summers | |
| 952,675 A | 3/1910 | Krum | |
| 963,320 A | 7/1910 | Peck | |
| 1,000,165 A | 8/1911 | Fischer | |
| 1,332,953 A | 3/1920 | Richards | |
| 1,373,111 A | 3/1921 | Young | |
| 1,432,513 A | 10/1922 | Zesbaugh | |
| 2,378,034 A | 6/1945 | Perryman | |
| 2,448,173 A | 8/1948 | Cowan | |
| 2,537,089 A * | 1/1951 | Rempel | 425/116 |
| 2,564,656 A | 8/1951 | Chedister | |
| 3,208,497 A | 9/1965 | Schutt | |
| 3,299,193 A | 1/1967 | Vergara | |
| 3,381,735 A | 5/1968 | Talcott et al. | |
| 3,617,589 A * | 11/1971 | Jones-Hinton et al. | 264/453 |
| 5,031,679 A | 7/1991 | Shoner | |
| 2004/0055640 A1 * | 3/2004 | Dojan et al. | 137/223 |

FOREIGN PATENT DOCUMENTS

| FR | 1364724 | 6/1964 |
|---|---|---|
| FR | 1510764 | 1/1968 |
| JP | 07-228111 | 8/1995 |

\* cited by examiner

Primary Examiner—John T. Haran
(74) Attorney, Agent, or Firm—Camoriano & Associates; Theresa Fritz Camoriano

(57) ABSTRACT

A welded item is shown having an extruded weld bead with a high tensile strength relative to the layers from which it is formed. A valve with an insert is shown. A ball with an internal plenum is shown.

10 Claims, 20 Drawing Sheets

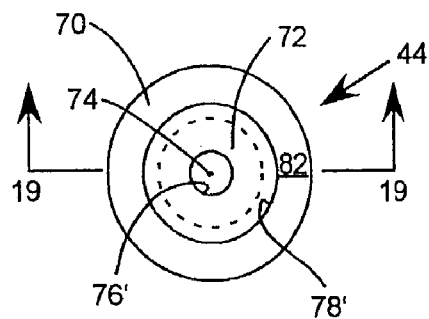
Fig. 18
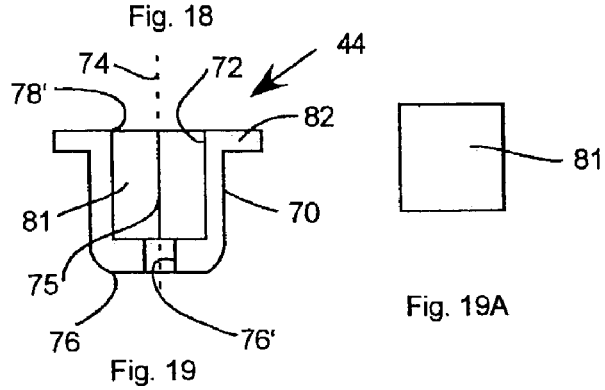
Fig. 19
Fig. 19A
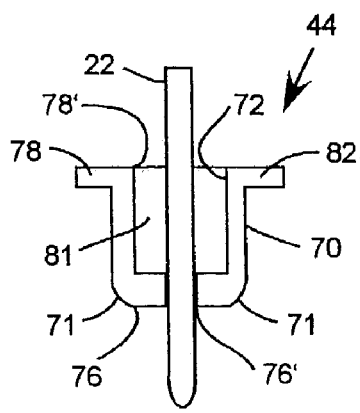
Fig. 20
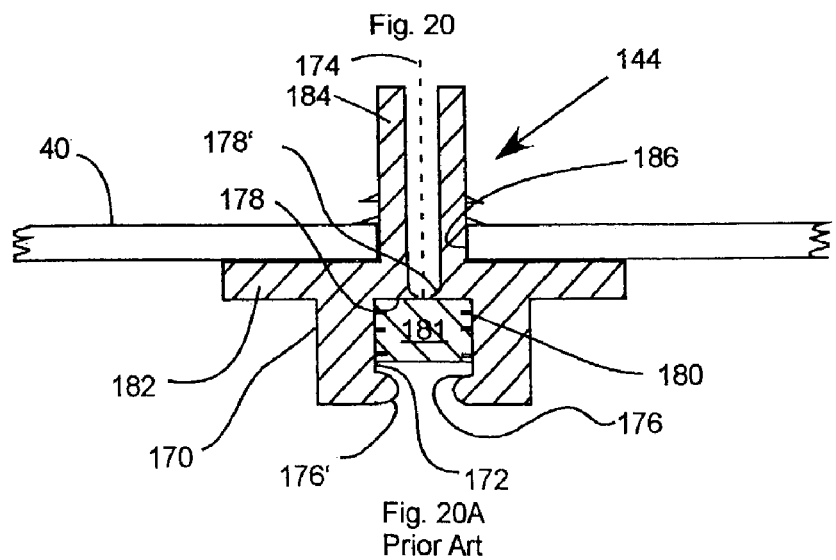
Fig. 20A
Prior Art

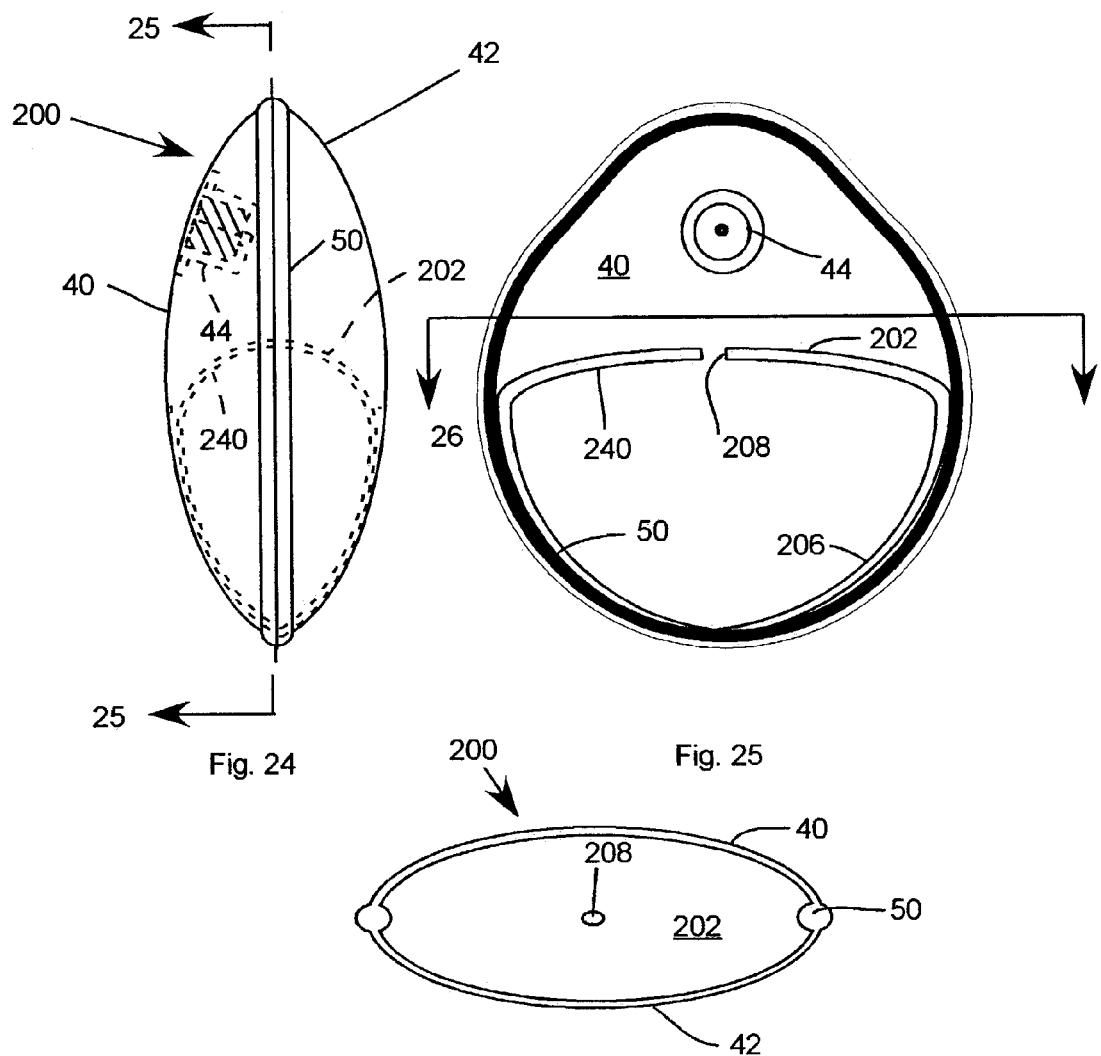

WELDED ITEM

BACKGROUND

This application is a continuation-in-part of U.S. patent application Ser. No. 09/879,709, filed Jun. 12, 2001, which claims priority from U.S. Provisional Patent Application Ser. No. 60/215,256, filed Jun. 30, 2000, both of which are hereby incorporated herein by reference. The present invention relates to balls and other welded plastic items. In the process of developing my prior invention relating to balls used inside of tires, and testing it in tires used for off-road motorcycle racing, which is a very rigorous and abusive environment, the balls had various failure modes. One failure mode involved the valves on the balls, and another involved the weld that held the two halves of the ball together.

In the prior art welds of layers of thermoplastic material, the weld is made in a weld area between two flat portions of opposed dies. The dies are energized, and the two layers of material between the dies are melted, merging together to form a single, merged piece. The weld made in that area between the two weld surfaces of the dies is what is relied upon to hold the two layers together. Whenever this process is used, it results in some thinning of the layer material adjacent to the weld. This creates a weak area, which is where the balls failed.

Other failure modes involved the valve that was used to inflate the ball. The valves were made of a material different from the material of the ball, and there were some failures at the weld/seal between the valve and the ball. In addition, the sharp corners of the valves abraded and even pierced the wall of the ball under the severe conditions of off-road motorcycle racing.

SUMMARY

The solutions of the present invention were developed in the process of improving the plastic welds and improving the valves for the balls used inside tire casings. These solutions are applicable not only to the balls for use in tire casings, but also for a wide variety of welded items, especially those that are able to sustain internal gas or liquid pressure, such as air mattresses, intravenous fluid bags, and inflatable toys. Various embodiments of the present invention provide improvements in the structure of welded inflatable items, providing an improved valve and an improved perimeter weld for these items.

While prior art welds of thermoplastic material rely upon a bonding of the material in the weld area, between the two dies that are used to heat the thermoplastic material, the weld of the present invention does not rely upon a bonding of the material in the weld area. Instead, the weld is developed by extrusion of material away from the normal weld area, to the interior of the welded item, forming an extruded weld bead that is comparable in tensile strength to the layer of materials from which it is formed, creating no weak spots, and ending the problem of failures in the weld area. Also, the improved weld is internal to the sealed product, so it is more aesthetically pleasing and less prone to failure from causes outside of the inflated item.

The improved valve does not separate from the layer material, is more reliable than prior art valves, and lends itself to mass production and assembly much more readily than prior art valves. Also, the valve insert is not dislodged during use but can be removed and replaced as it wears or deteriorates, if needed, while the inserts in prior art valves cannot be replaced.

BRIEF DESCRIPTION OF THE DRAWINGS

FIG. 18 is a bottom view of the valve used in FIGS. 2–11;

FIG. 19 is a schematic section view of the valve of FIG. 18, taken along line 19—19, including the insert;

FIG. 19A is a schematic section view of the insert of FIG. 19 before it has been inserted into the valve and pierced by a needle;

FIG. 20 is the same view as FIG. 19, but with an inflation needle inserted through the valve;

FIG. 20A is a schematic section view of an installed prior art valve;

FIG. 24 is a schematic side view of a ball with an internal plenum made in accordance with the present invention;

FIG. 25 is a schematic view taken along the line 25—25 of FIG. 24; and

FIG. 26 is a schematic view taken along line 26—26 of FIG. 25;

DESCRIPTION OF THE PREFERRED EMBODIMENTS

Figure 1:
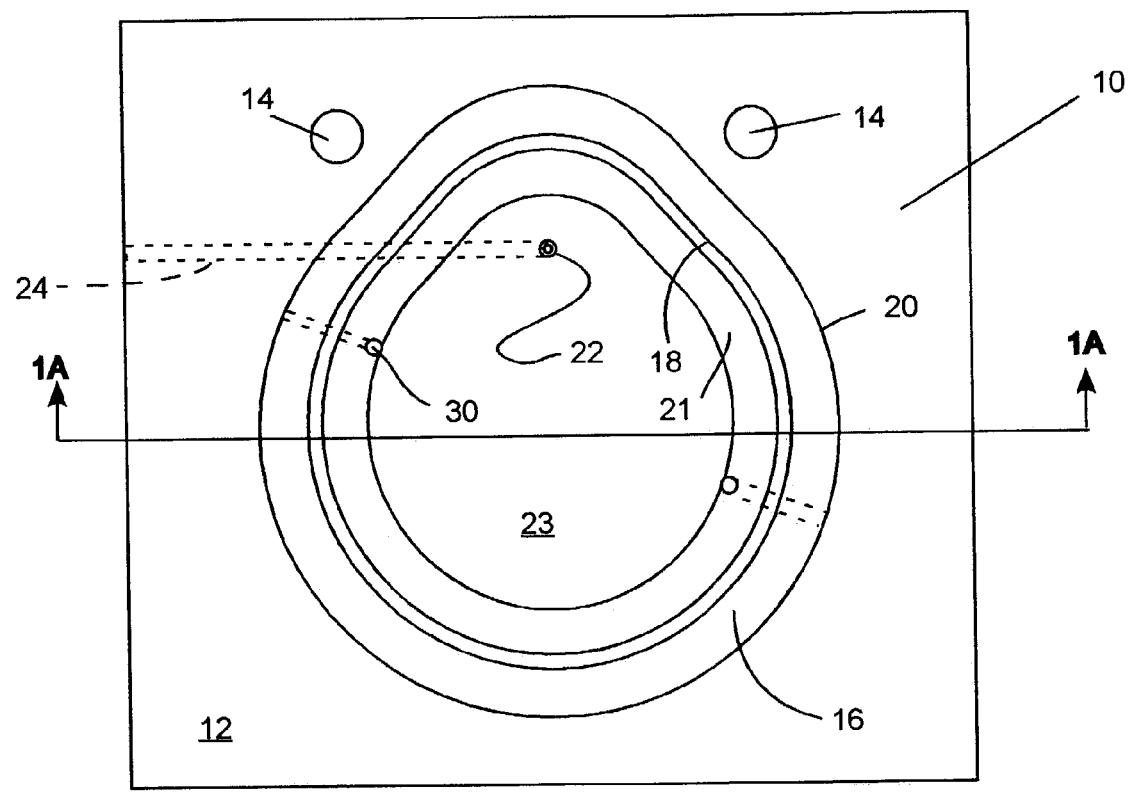
FIG. 1 is a schematic plan view of a bottom die for forming a welded, inflatable item in accordance with the present invention.
Figure 1A:
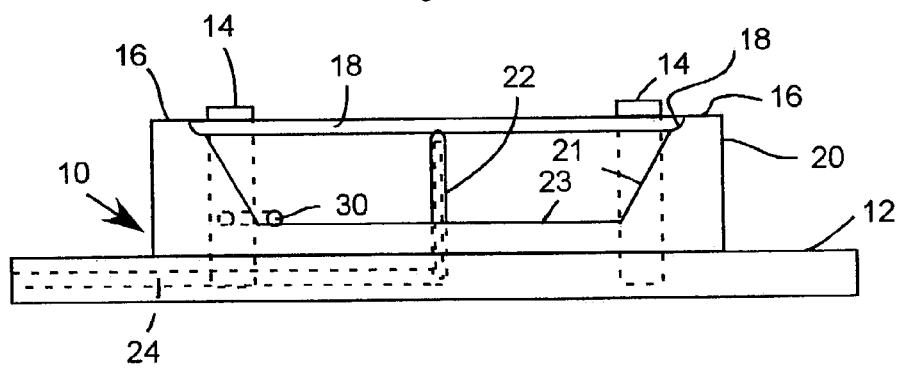
FIG. 1A is a schematic section view taken along the line 1A—1A of FIG. 1.

FIGS. 1–9 show a process for making a welded item in accordance with the present invention. FIGS. 1 and 1A show the bottom die 10 used to weld the item. The bottom die 10 includes a base plate 12 with upwardly-projecting registration pins 14. A flat weld surface 16 is elevated from the base plate 12 and defines a closed perimeter, having an arcuate cross-section recess 18 along its interior edge and having an exterior 20. A tapered wall 21 extends downwardly from said arcuate cross-section recess 18 to a bottom face 23. The bottom die 10 includes an inflation conduit 24, extending from the outer edge of the base plate 12 to a hollow inflation needle 22. It also has vent holes 30 extending from the wall 21 to the outside. While one vent hole 30 is shown, it is understood that the vent holes 30 are distributed at intervals around the wall 21.

Figure 1B:
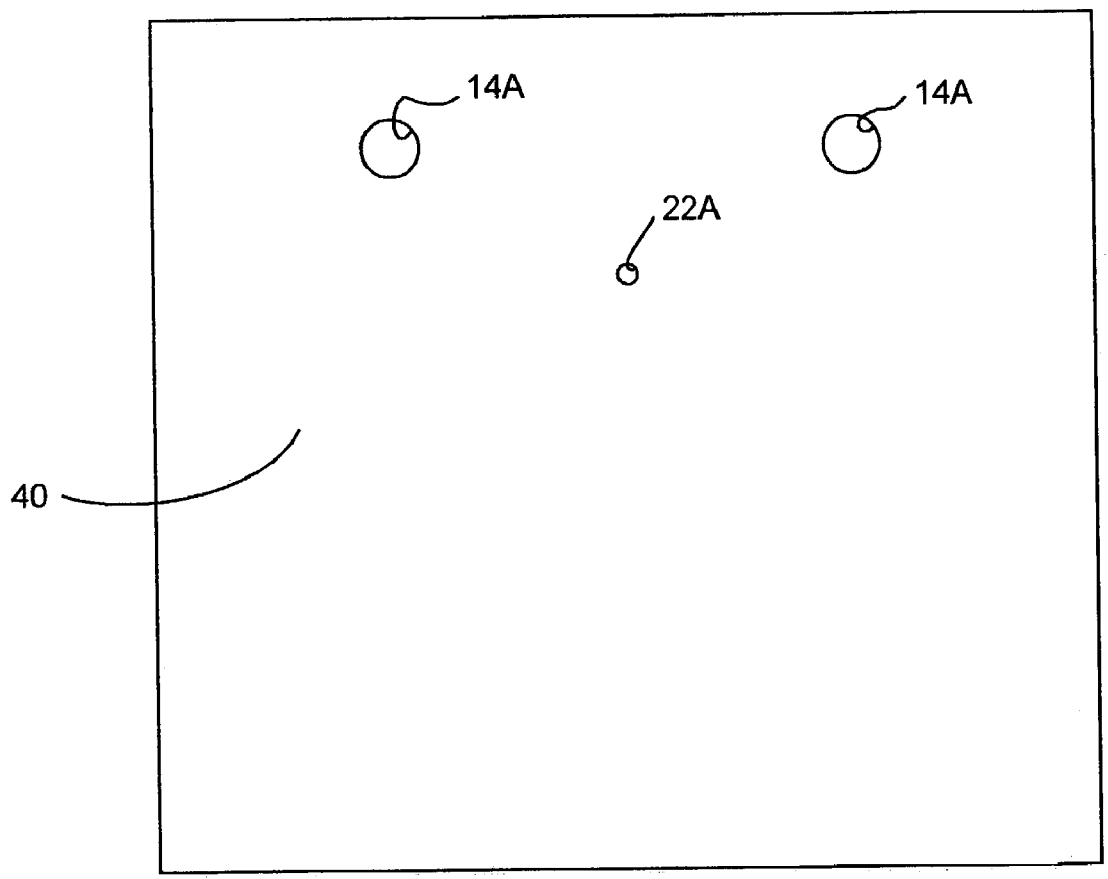
FIG. 1B is a plan view of a layer of material that is to be welded.

FIG. 1B shows an initial layer 40 of thermoplastic material, onto which a valve will be welded. This layer 40 then will be placed on the bottom die 10 for welding to another layer. This layer 40 has two holes 14A, which will receive the registration pins 14 to align the layer 40 with the die 10. It also has a small hole 22A, which will be located at the center of the valve.

Figure 1C:
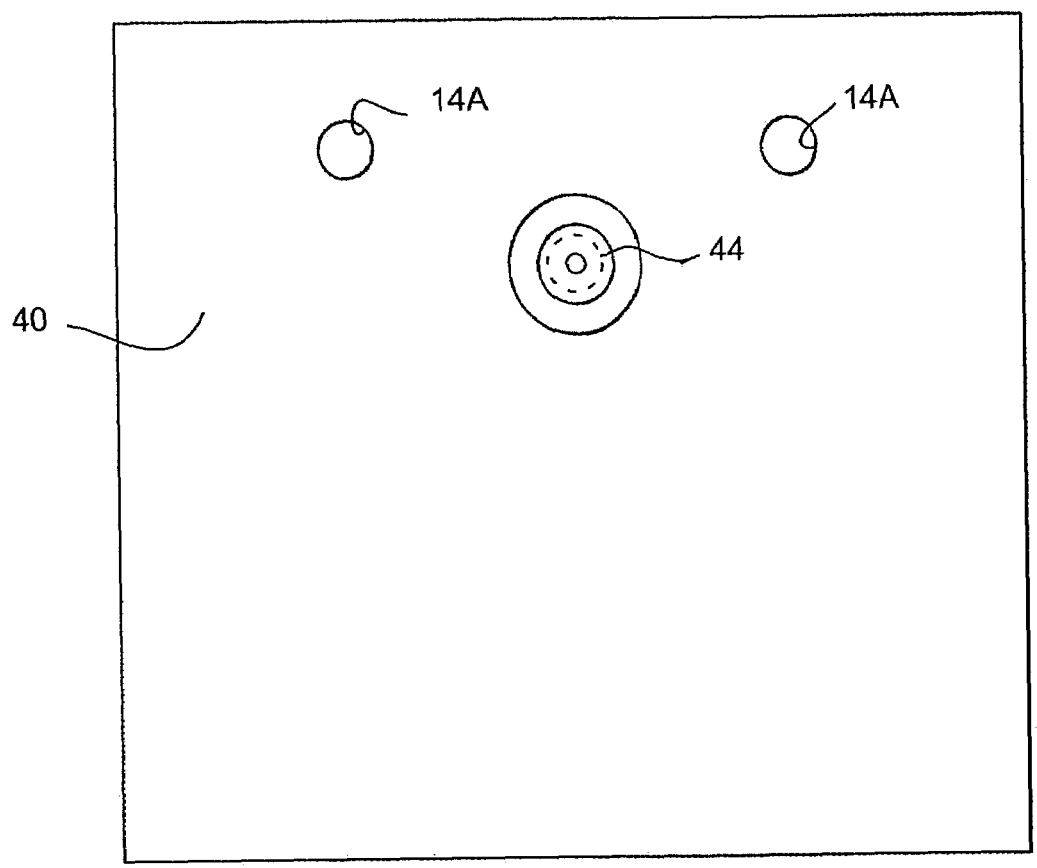
FIG. 1C is a plan view of the layer of FIG. 1B after a valve has been welded onto the layer.
Figure 1D:
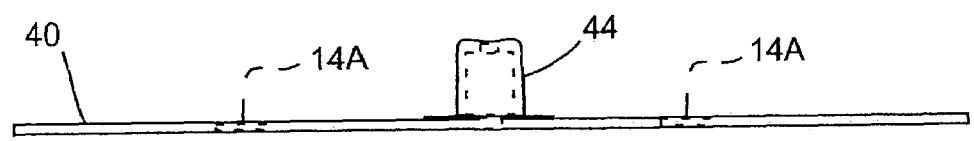
FIG. 1D is a side view of the layer and valve of FIG. 1C.

FIGS. 1C and 1D show the layer 40 with the valve 44 welded in place. The process for welding the valve 44 onto the layer 40 will be described in detail later.

Figure 2:
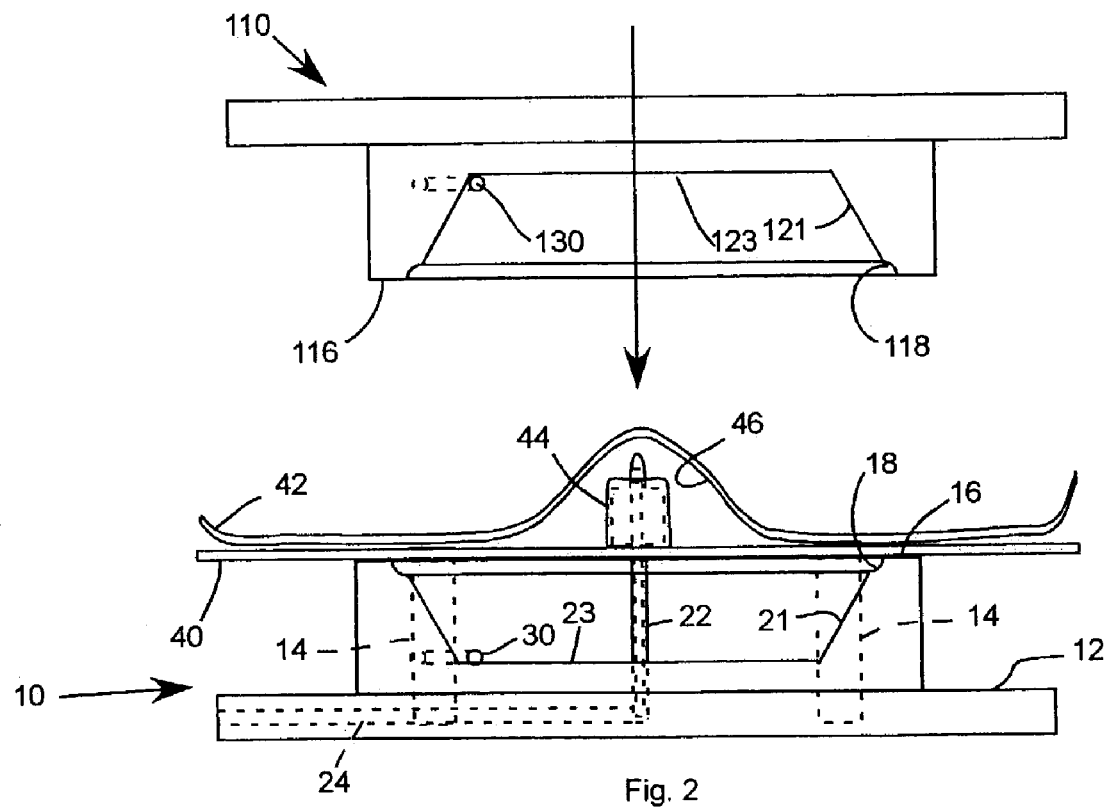
FIG. 2 is a schematic section view similar to FIG. 1A, but showing the upper and lower dies and the two layers of material to be welded together to form an item in accordance with the present invention.

Looking at FIG. 2, it can be seen that the layer 40 with the valve 44 has been placed onto the lower die 40, with the registration pins 14 extending through the holes 14A of the layer 40, and with the hollow inflation needle 22 projecting through the valve 44. An upper layer 42, which is identical to the lower layer 40 as shown in FIG. 1B except without the hole 22A, has also been placed over the registration pins 14 and on top of the layer 40. The upper and lower layers 42, 40 preferably are made of the same thermoplastic material. While the layers 42, 40 are shown herein as being separate pieces, they could, instead, be made of a single piece that has been folded over onto itself, forming two layers.

The upper die 110 is essentially a mirror image of the lower die 10, having a flat weld surface 116 opposite the flat weld surface 16 of the lower die 10, and having an arcuate cross-section recess 118 along the interior edge of the flat weld surface 116, a tapered wall 121, and a face 123. It also has vent holes 130 to permit gas to exit the interior of the dies 10, 110, respectively, as the ball or other welded item is inflated. As with the vent holes 30 in the lower die 10, only one vent hole 130 is shown in the upper die 110, but it is understood that the vent holes 130 are distributed at intervals along the wall 121 or face 123.

The upper and lower flat weld surfaces 116, 16 are the die surfaces that will come into close proximity to each other during the welding process. In this particular embodiment, the welding process that is used is radio frequency welding. In that process, the thermoplastic material between those opposed weld surfaces 116, 16 will be heated and will melt to form the weld. Under normal welding procedures, a substantial gap remains between the opposed weld surfaces 116, 16 (nearly the thickness of the two layers of material being welded together), and almost all the thermoplastic material that was originally between those surfaces remains between those surfaces and forms the weld that will hold the layers of thermoplastic material together. However, in the procedure described herein, the two weld surfaces 116, 16 of the opposed dies are brought into very close proximity, with the gap between those surfaces being much less than the combined thicknesses of the layers being welded together. This causes the heated thermoplastic material to extrude away from the gap between the weld surfaces 116, 16 to an adjacent extrusion area, where it forms what we will refer to herein as an extruded weld.

Still referring to FIG. 2, between the upper and lower dies 10, 110 are the first and second flat layers 40, 42 of thermoplastic material. These layers 40, 42 have a uniform thickness and lie flat against each other in the area of the weld surfaces 16, 116, which define the perimeter of the product being welded. The valve 44 has already been welded onto the first layer 40 prior to this step. The details of the valve 44 and the process of installing the valve 44 onto the layer 40 will be described later. The hollow needle 22 is inserted through the valve 44 into the space 46 between the first and second layers 40, 42, which will become the interior of the ball.

Figure 3:
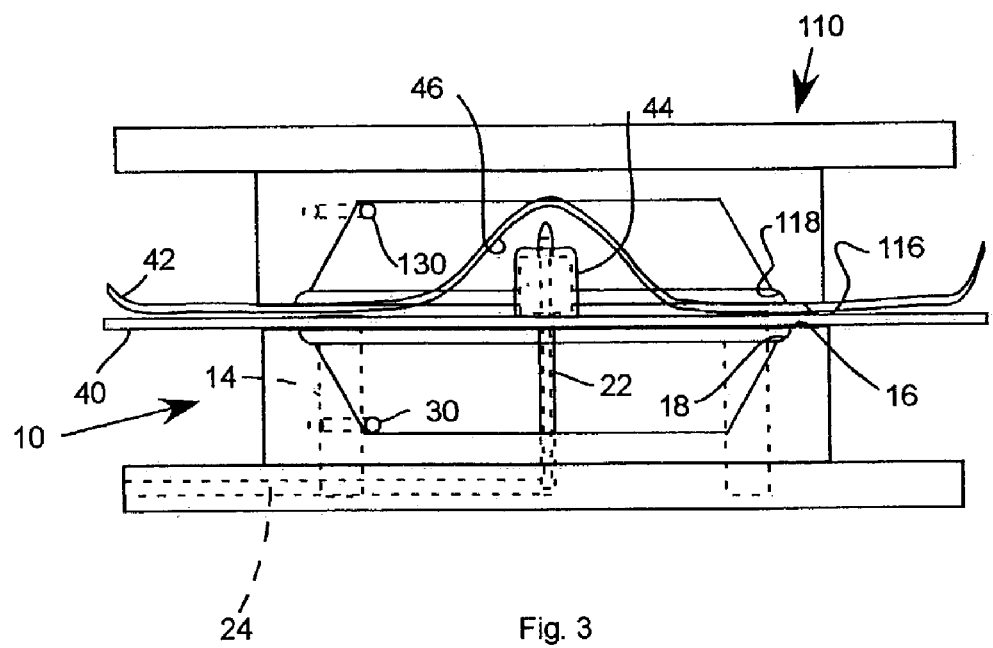
FIG. 3 is similar to FIG. 2, but showing the top die pressed down, clamping the layers between the top and bottom dies.

Next, as shown in FIG. 3, the top die 110 is brought down into contact with the top layer 42 and presses the layers 40, 42 between the upper and lower flat weld surfaces 116, 16, respectively, creating an air tight seal around the perimeter.

Figure 4:
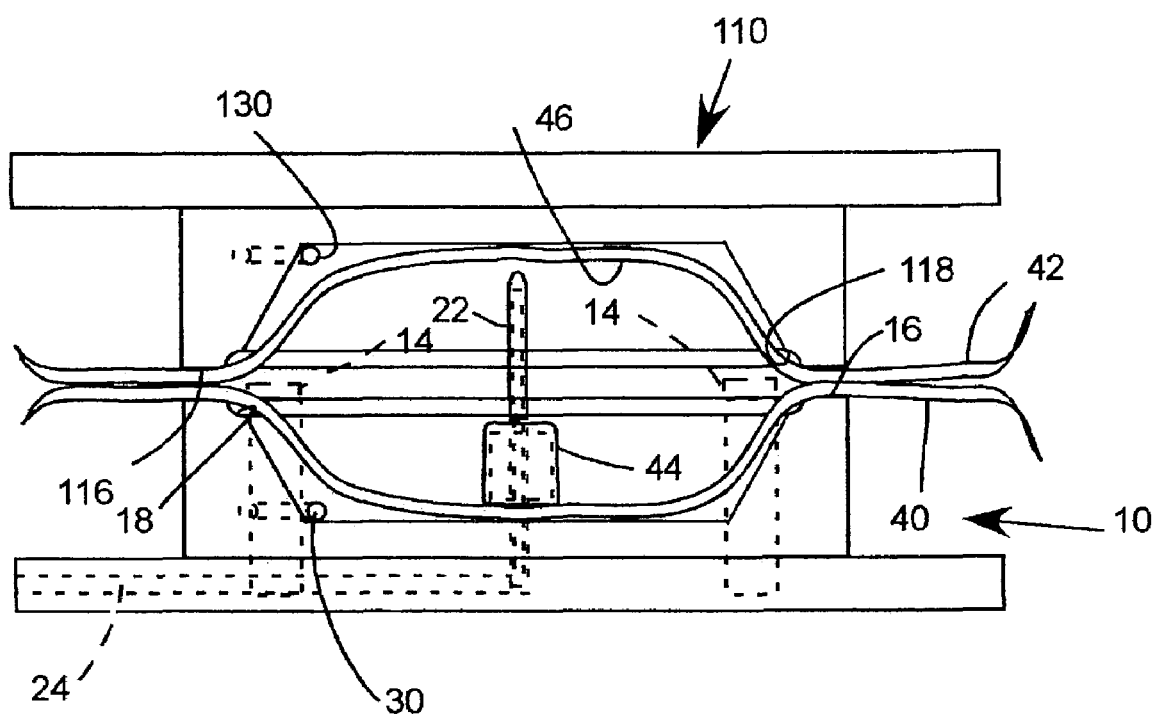
FIG. 4 is similar to FIG. 3, but showing the next step in the process, injecting gas between the layers to cause the layers to separate from each other.

Next, as shown in FIG. 4, air or some other gas or other fluid is introduced under pressure through the path 24 and through the needle valve 22, forcing the two layers 40, 42 apart. The vent holes 30, 130 allow air to vent along the wall of the dies as the gas comes in through the needle 22 and inflates the space 46 between the layers 42, 40, so there is no buildup of external air pressure preventing the two layers from expanding away from each other, and enabling the layers 42, 40 to be forced against the walls of the dies by the internal fluid pressure. While in this preferred embodiment it is described that venting through holes 30 and 130 allows gas to escape as fluid is injected between the layers, it is also possible to pull a vacuum to evacuate gas out through the holes 30 and 130, causing outside air to be pulled into the inner chamber 46 through the needle valve 22. This process would be typical for a "vacuum forming process". At this time vacuum forming is a slower process than that described in the preferred embodiment and thus is in less favor form a manufacturing cost perspective. However, vacuum forming could produce an equally acceptable product. Likewise, injection molding could be used to produce the layers 40 and 42 in a "clamshell" shape much like that which occurs when gas is injected between the two layers. Currently, injection molding tooling to produce such "clamshell" shapes is much more expensive to produce than the tooling described in the preferred embodiment, but it would produce an equally acceptable final product. Likewise, centrifugal casting, rotational molding and blow molding may be used to replace one or more of the steps described herein.

Figure 5:
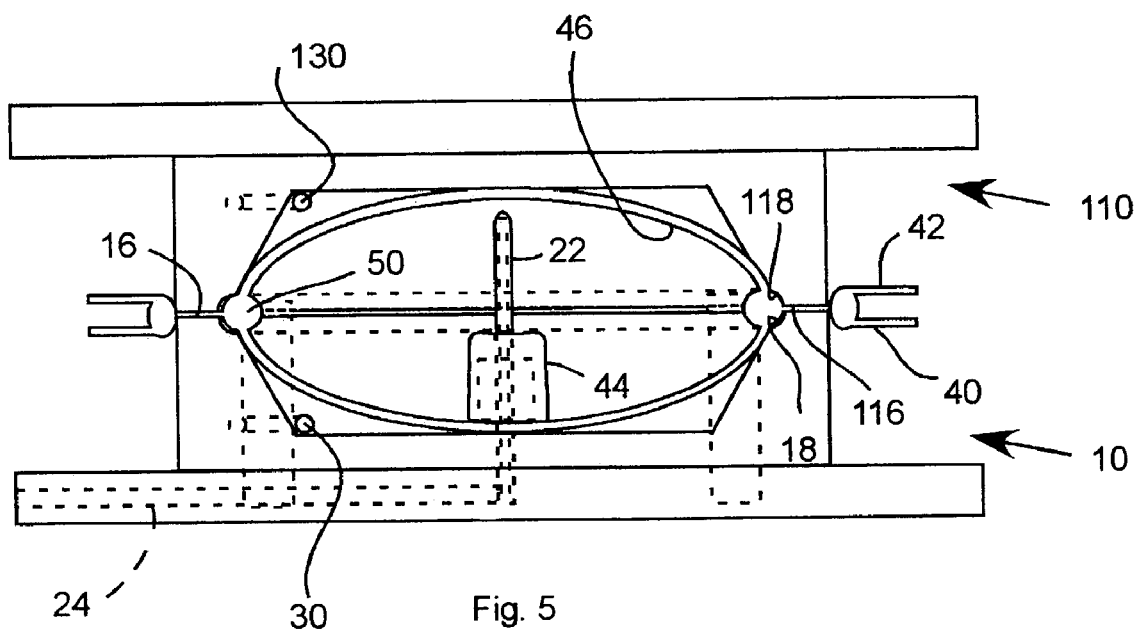
FIG. 5 is similar to FIG. 4, but showing the next step in the process, in which the material is heated and extruded.

Next, as shown in FIG. 5, the radio frequency energy is applied to the upper and lower dies 110, 10, while the dies 110, 10 are applying pressure to the layers 40, 42. This melts the thermoplastic material between the opposed weld surfaces 16, 116, and, as the dies press together toward pre-set limit stops (not shown), the melted thermoplastic material extrudes inwardly and outwardly. The air pressure in the space 46 between the layers 42, 40 pushes the extruded material against the interior wall of the dies, filling the arcuate recesses 18, 118, and thereby forming an interior weld bead 50 around the entire interior of the perimeter. (It should be noted that, while radio frequency welding is used here, it would be possible to apply energy in other ways to melt the thermoplastic material and form the weld instead of using radio frequency welding.)

In this particular embodiment, the final gap or spacing between the weld surfaces 16, 116 of the upper and lower dies 110, 10 is approximately 10% of the original thickness of the combined layers 42, 40. It is preferred that the final gap be less than 30% of the combined thicknesses of the layers, so that most of the material in the area between the weld surfaces 16, 116 is extruded away from that area.

This process welds the layers together, meaning that the materials melt and join together so that they are indistinguishable from each other, with no boundary layer remaining. This occurs both in the normal weld area in the gap between the weld surfaces 116, 16 (which is very thin) and in the extruded weld area, where the perimeter weld bead 50 is formed. This is very different from bonding the layers together with an adhesive, in which there is a different material applied between the layers, each layer retains its original dimensions, and there is a distinct boundary between the layers in the area of the weld. Also, in the case of adhesive, no weld bead would be formed.

Figure 6:
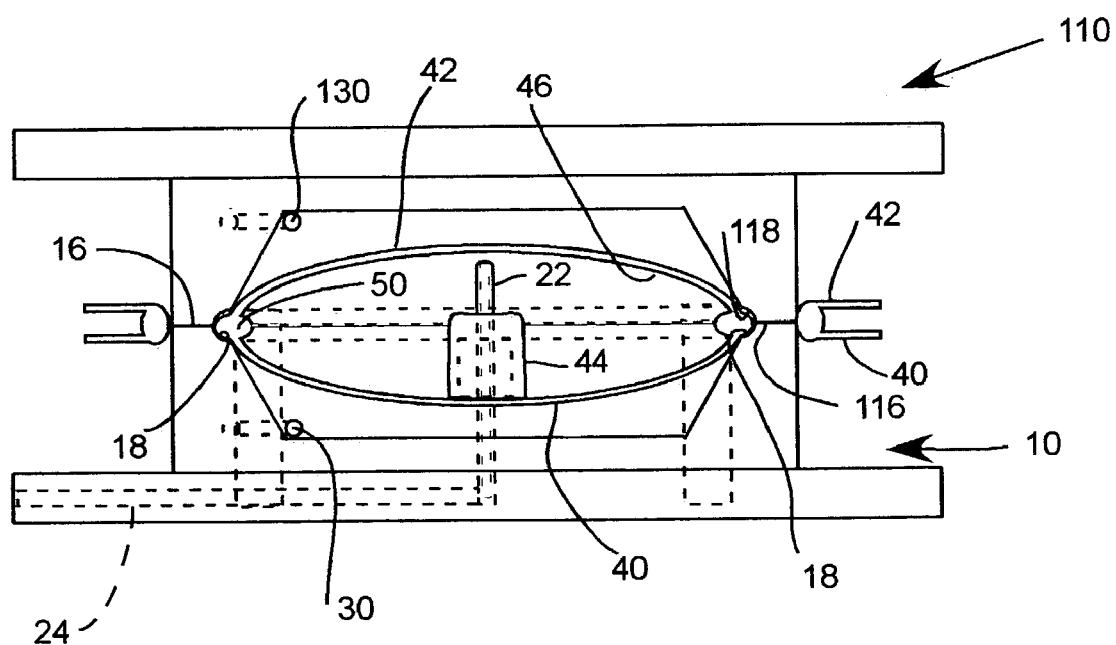
FIG. 6 is similar to FIG. 5, but showing the next step in the process, with the internal gas being vented.

At this point, the product can be allowed to remain in place and remain inflated as it cools, or, as shown in FIG. 6, the air in the space 46 between the layers 42, 40 can be vented out through the needle 22 and through the path 24, reducing the internal pressure so the product to be removed from the dies before it has completely cooled, without damaging the weld.

Figure 7:
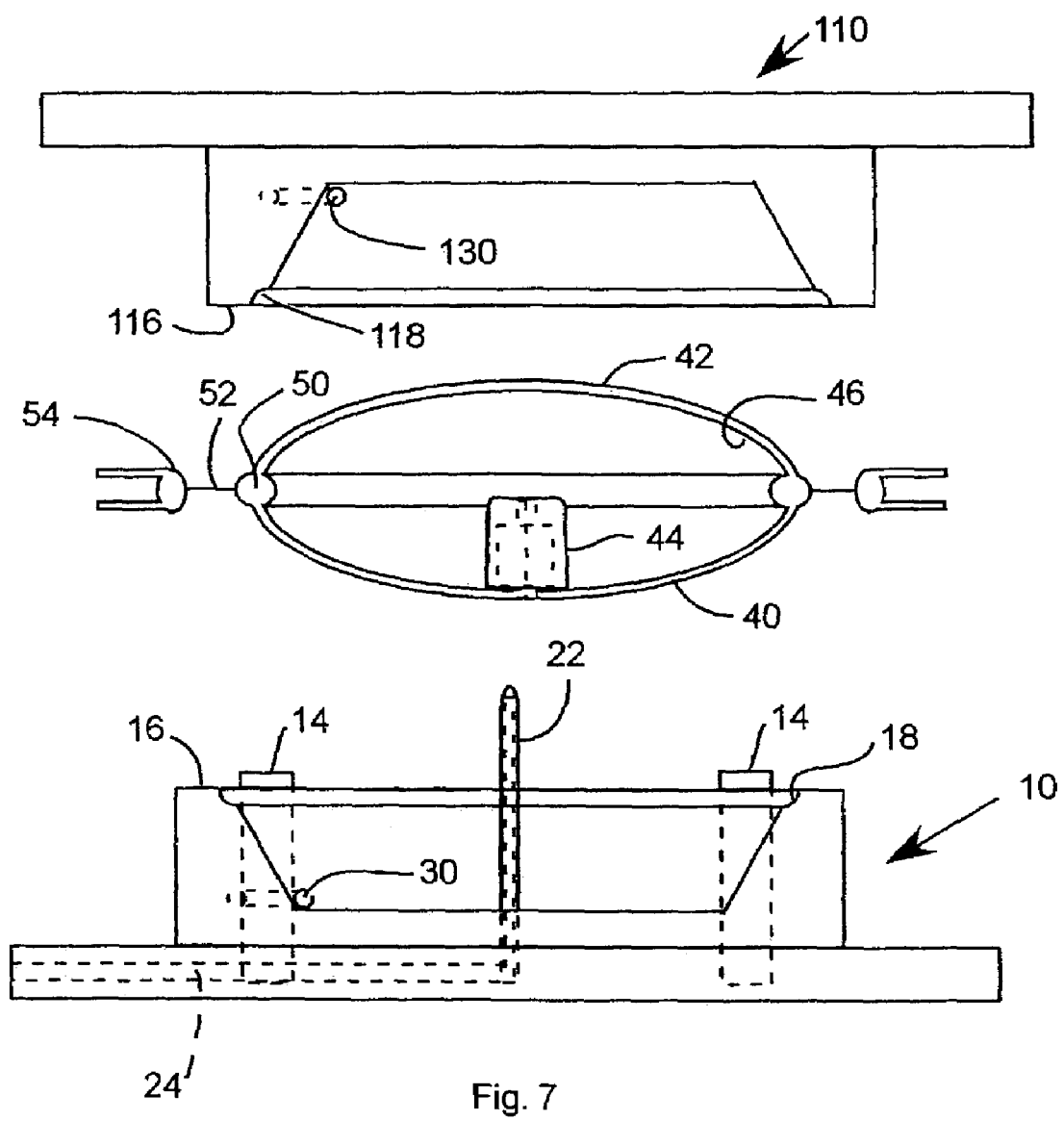
FIG. 7 is similar to FIG. 6, but showing the next step, of separating the dies and withdrawing the product from the dies and from the inflation needle.

As can be seen in FIG. 7, once the product has been removed from the dies 110, 10, it has a tail 52 projecting outwardly opposite the internal weld bead 50. The tail 52 has a thickness corresponding to the final gap between the weld surfaces 16, 116, which, in this case, is 10% of the thickness of the combined layers. In the prior art, the tail 52 would be much thicker, as it would be the normal weld area that is depended upon to hold the layers together. However, in this preferred embodiment, the tail 52 is simply excess material, which may be removed, if desired. So, the area that would have been the sealing weld in prior art processes is, in this embodiment, superfluous material.

Figure 8:
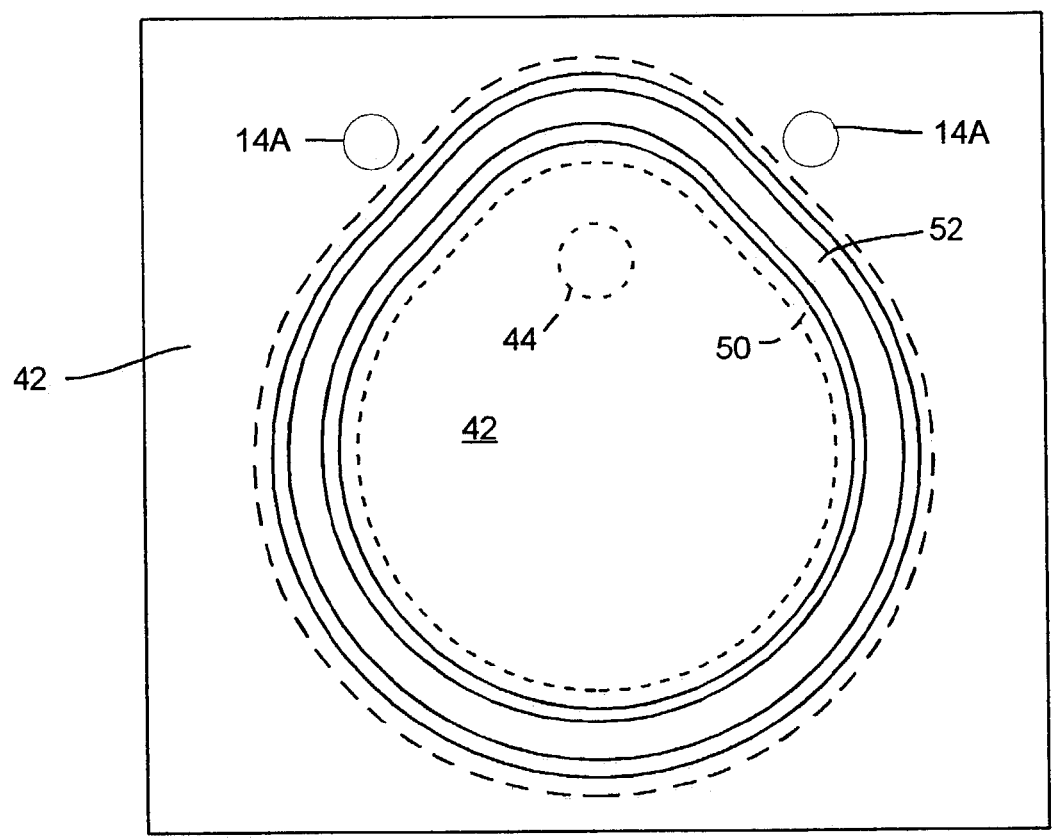
FIG. 8 is a plan view of the welded product.
Figure 9:
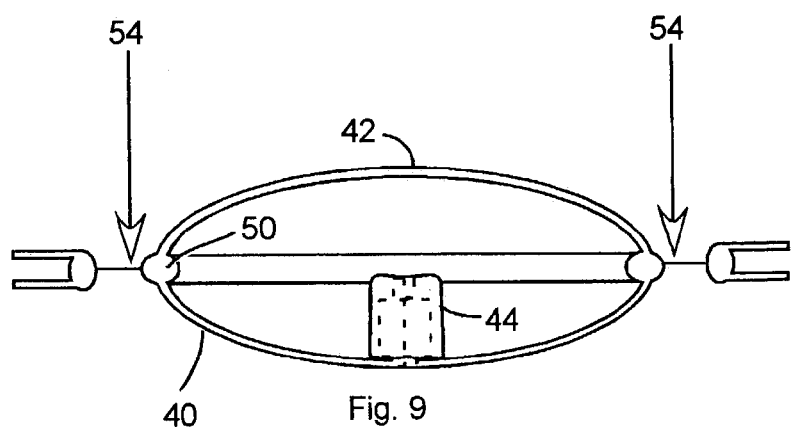
FIG. 9 is a section view of the welded product.
Figure 10:
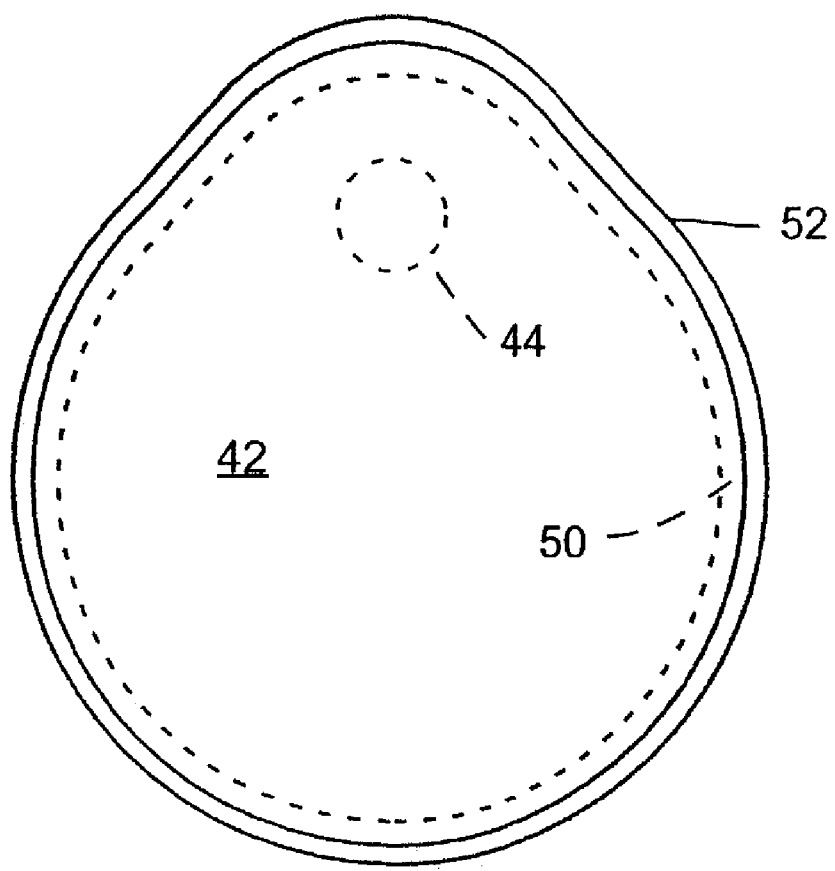
FIG. 10 is a plan view of the welded product after scrap along the outside of the weld has been removed.
Figure 11:
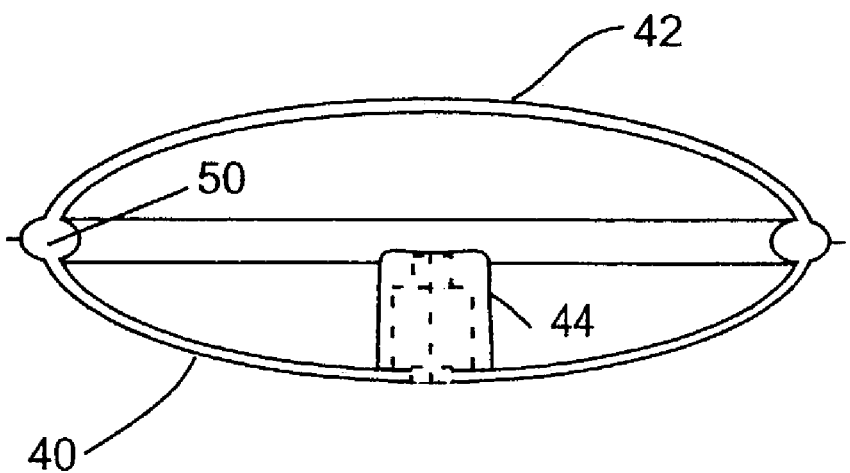
FIG. 11 is a section view of the product of FIG. 10.

FIG. 8 is a plan view of the final product, showing the extruded perimeter weld bead 50 and the tail 52, as well as the valve 44. FIG. 9 is a schematic section view of the product of FIG. 8, with arrows 54 showing the diameter where the tail 52 will be cut off. FIGS. 10 and 11 are schematic views showing the product after most of the tail 52 has been removed.

Figure 2A:
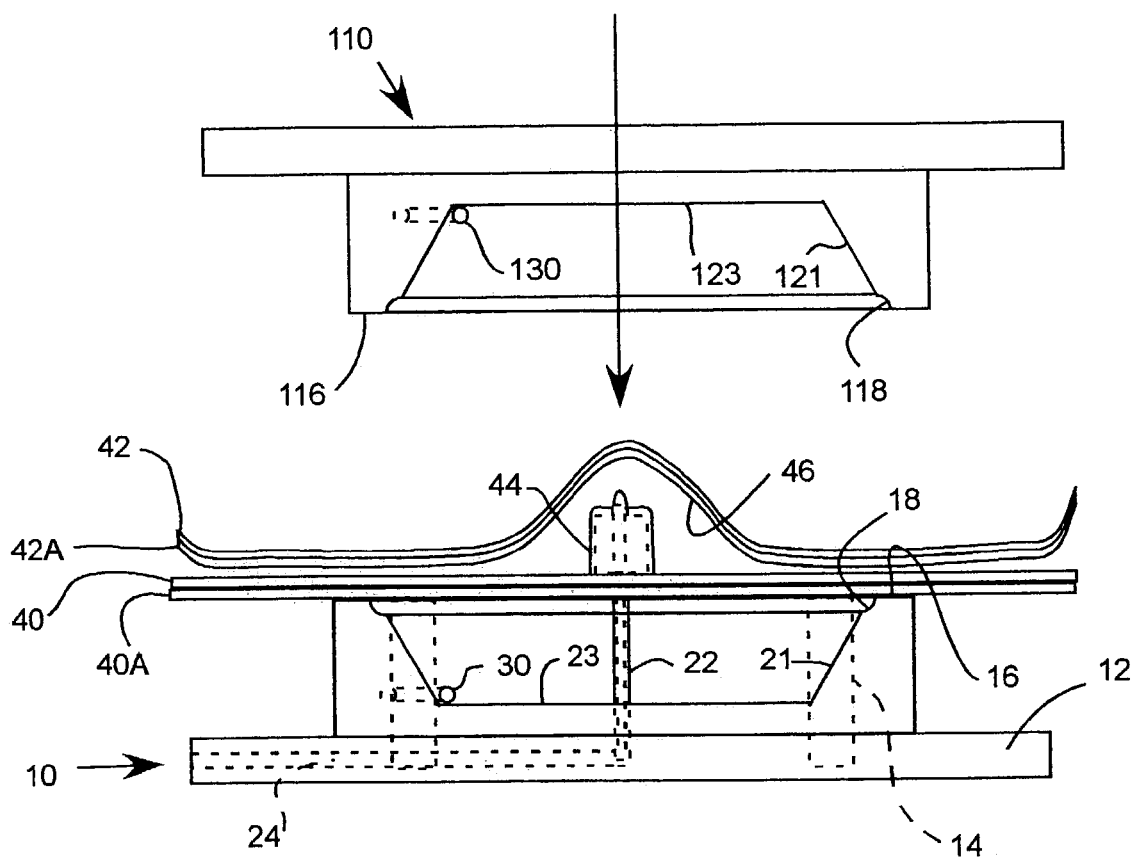
FIG. 2A is a schematic section view similar to FIG. 2, but showing four layers of material being welded together.

FIG. 2A is the same as FIG. 2, except that there are two upper layers 42, 42A of thermoplastic material and two lower layers 40, 40A of thermoplastic material. The valve 44 has been welded to the two lower layers 40, 40A. This arrangement will form a double-walled ball, and the gap between the weld surfaces 116, 16, when the welding process is complete, will be about 10% of the total thickness of the four layers. This view is intended to show that various numbers of layers could be welded together in this process. It also is not necessary that there be the same number of layers on both sides of the space 46 or that all the layers have the same thickness.

Figure 12:
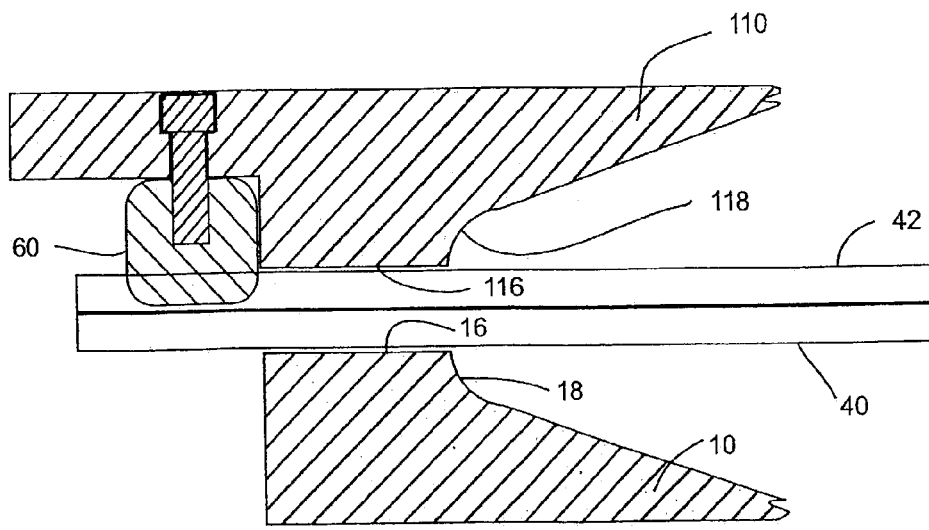
FIG. 12 is a broken-away, enlarged schematic section view of the left side of FIG. 3 but with a dam added.
Figure 13:
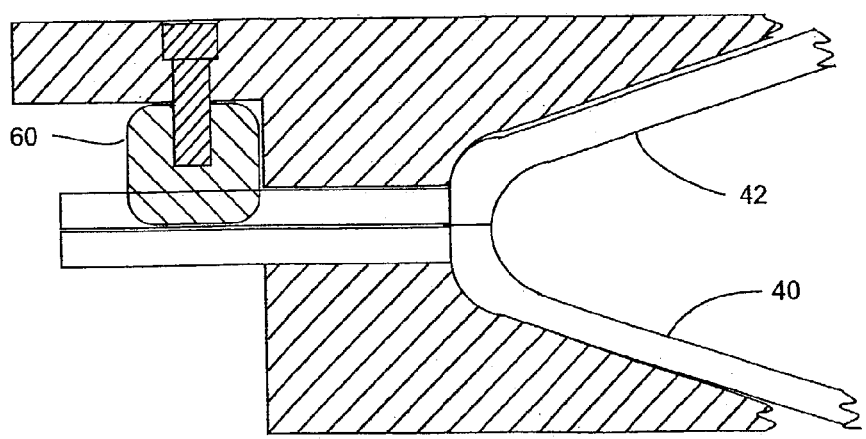
FIG. 13 is the same as FIG. 12 but with gas having been injected between the layers.
Figure 14:
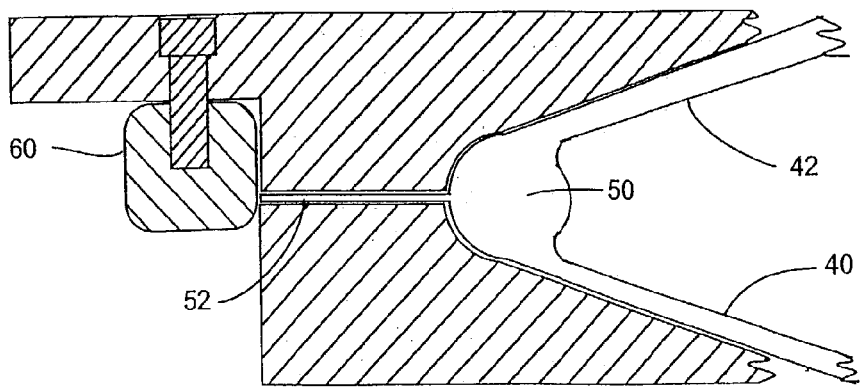
FIG. 14 is the same as FIG. 13, but with the material having been heated and extruded.

FIGS. 12–14 show a slightly modified welding process, which is the same as the process shown in FIGS. 3–5, except that a Mylar ring 60 has been added to the outside of the upper die 110 just outside of and projecting downwardly below the surface of the upper weld surface 116. In this arrangement, the Mylar ring 60 serves as a dam, preventing the melted thermoplastic material between the weld surfaces 116, 16 from extruding outwardly, so that almost all of the material that was originally between the weld surfaces 116, 16 extrudes inwardly to form the internal weld bead 50. The use of a dam 60 is particularly helpful when the layer material is thin, in order to ensure that sufficient material extrudes inwardly to form a good internal weld bead 50.

The Mylar ring is secured to the upper die 110. It lies adjacent to the flat welding surface 116 of the upper die and projects downwardly toward the lower die 10 beyond a plane formed by the flat surface 116. As the two dies 110, 10 are pressed together and the gap between them is reduced, the Mylar ring 60 closes off the end of the gap between the flat welding surfaces 116, 16, forcing the material that is being extruded from between the flat welding surfaces 116, 16 toward the recesses 118, 18.

Figure 15:
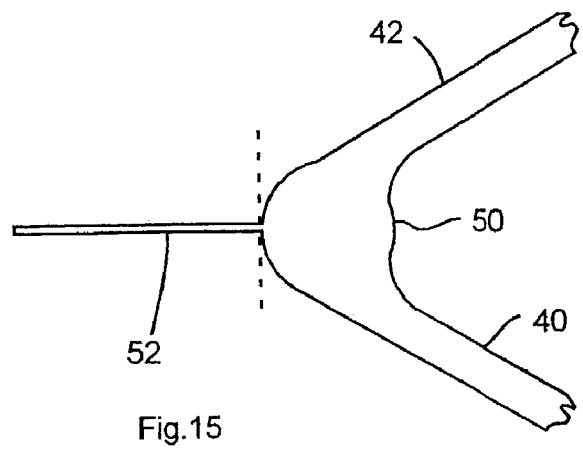
FIG. 15 is a broken-away section view of the welded product of FIG. 14.

FIG. 15 is an enlarged view showing the internal weld bead 50 and the tail 52 formed in the process of FIGS. 3–5 or in the process of FIGS. 12–14. It will be noted that there is no area in the entire ball in which the thickness is less than the uniform thickness of the layers 42, 40. Thus, this welding process has not produced any thin, weakened areas, and the area of the weld has essentially the same tensile strength as the layers 42, 40 from which it is made. In fact, the entire weld area has a greater thickness than the layers 42, 40. The result is a butt weld (with the ends of the layers abutting each other), rather than a face-to-face weld, which is the norm in the prior art.

Figure 16:
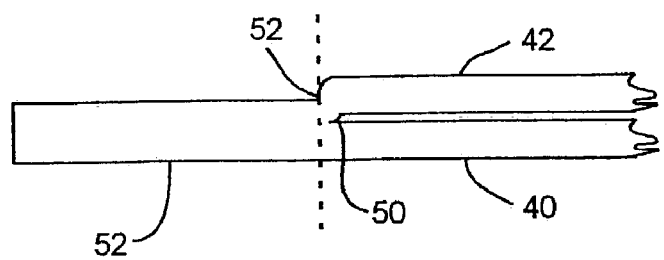
FIG. 16 is a view similar to FIG. 15 but showing a prior art welded product.

It is known in other welding process, such as metal welding, that a butt weld forms a stronger weld than does a face-to-face weld, and, in fact, tests have proven that to be true here. FIG. 16 shows a prior art weld, in which the thickness of the portion 52 between the two flat weld surfaces is nearly as great as the combined thicknesses of the layers (80% or greater of the combined thicknesses). It is this face-to-face weld portion 52 that actually holds the layers together. Instead of forming a large internal weld bead 50, as in FIG. 15, a very small internal weld bead 50 is formed, and there is a thinning in the area 52', with that area having a thickness that is less than the uniform thickness of the layers 42, 40, resulting in a weak area in the area of the weld. It was this thinner area 52' that was the site of failure in the balls that were made prior to developing the present invention. Tests of these prior art welds showed that the tensile strength of the weld was approximately 25% of the tensile strength of the individual layers from which the weld was formed. In contrast, tests of the weld shown in FIG. 15 found that the weld had a tensile strength more than double that of the prior art weld, being at least 50% of the tensile strength of the layers 40, 42 and typically 75%–80% or more of the tensile strength of the individual layers 40, 42. If multiple layers are used for either side of the weld, as shown in FIG. 2A, then the tensile strength of the weld would be at least 50% of the tensile strength of the combined layers on either side of the weld.

Figure 17:
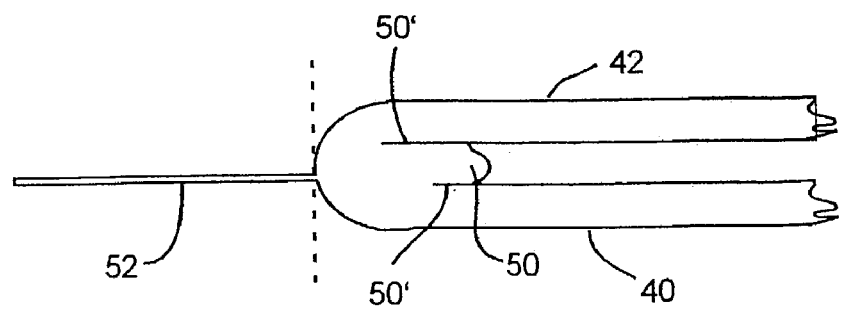
FIG. 17 is a view similar to FIG. 16, but with greater compression.

FIG. 17 shows a weld that was made using the prior art dies used in FIG. 16 (without providing recesses 18, 118), but compressing the gap between the weld areas of the upper and lower dies to 10% of the combined thicknesses of the layers. While this resulted in an improved weld over the prior art weld of FIG. 16, there was still a thinned or weakened area, some boundary layers 50' remained, and, when the layers 42, 40 were pulled apart, the weld separated at the boundary layers 50', leaving the area of the weld thinner than in the embodiment of FIG. 15.

Figure 15A:
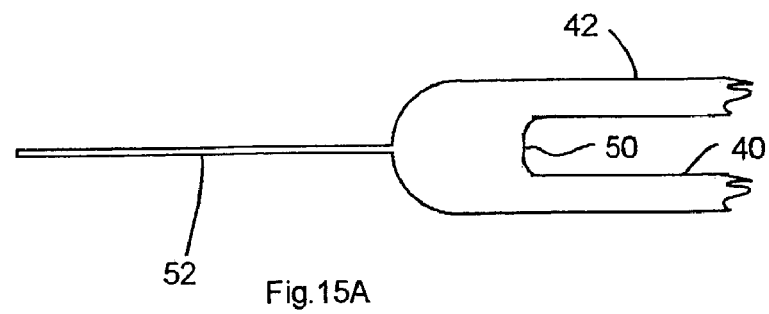
FIG. 15A is a view similar to FIG. 15, showing a weld that was made using the same dies that were made to form the weld of FIG. 15, but the space between the layers was not inflated during the welding process.

FIG. 15A shows a weld that was made using the same dies that were made to form the weld of FIG. 15, but the space between the layers was not inflated during the welding process. The result was far superior to either of the results in FIGS. 16 and 17, producing a weld that is at least 50% as strong as the layer material 42, but not as strong as the weld shown in FIG. 15, where internal pressure is applied to force the extruded material against the recessed areas 18, 118 during the welding process. The best results were obtained by providing recesses 18, 118 adjacent to the weld surfaces 16, 116 and inflating the interior of the ball during the extrusion process, as described with respect to the weld shown in FIG. 15.

FIG. 20A shows a prior art valve 144 welded onto a layer 40 of thermoplastic material. These types of valves 144 are commonly used in basketballs, volleyballs, and other inflatable items. The valve body 170 defines a cylindrical cavity 172 having a central axis 174 and first and second ends 176, 178. The first and second ends 176, 178 define respective first and second openings 176', 178' aligned along the axis 174. These openings 176', 178' have diameters that are substantially smaller than the diameter of the cavity 172. In this particular valve, there are small internal annular ridges 180 in the cavity 172. Adjacent the second end 178 of the cylindrical cavity 172 is an outwardly-projecting flange 182. A hollow cylindrical neck 184, aligned along the axis 174, extends upwardly from the flange 182.

A cylindrical valve insert 181 is inserted into the cylindrical cavity 172 through the opening 176' at the first end 176 of the valve body 170. This insert 181 is made of a softer material than the material of the valve body, allowing it to deform in order to be inserted into the cavity 172. The normal outside diameter of the valve insert 181 is greater than the inside diameter of the cavity, so the insert 181 is compressed radially in order to fit into the cavity (and is retained in a state of radial compression once it is inserted into the cavity 172). The height of the insert 181 is substantially shorter than the height of the cavity, as can be seen in FIG. 20A. Once the insert 181 is inserted into the cavity 172, it is captured by the two smaller diameter ends 176, 178.

In order to install the prior art valve 144 on the layer 40 of thermoplastic material, a hole 186 is made in the layer 40, and the neck 184 is pushed through the hole 186 until the flange 182 abuts the interior surface of the layer 40. The diameter of the hole 186 is sized so that the outside diameter of the neck 184 just fits through. A radio frequency weld is made between the flange 182 and the layer 40, melting and melding together those materials. Once the valve is welded to the layer 40, the portion of the neck 184 projecting out beyond the layer 40 is cut off. Then, a hole (not shown) is pierced axially through the insert 181. Under normal conditions, the compressive force of the valve body 170 against the insert 181 keeps the hole closed. However, a hollow needle can be pushed through the hole to inflate the product, and then, when the needle is removed, the compressive force of the valve body 170 causes the hole to close again.

Once the valve 144 has been welded onto the layer 40, the valve insert 181 cannot be removed without destroying it, because the only possible access is by way of the opening 176, which is internal to the object being produced. Also, a new insert cannot be inserted through the opening 178'. There are several factors preventing the removal and re-insertion of an insert in this design. First, the opening 178' has a very small inside diameter. Second, the height distance from the inside of the end 178 of the cavity 172 to the outside of the layer 40 is substantial. Third, the material of the valve body is stiffer than the material of the layer 40.

FIGS. 18–20 and 21–23 show a valve 44 made in accordance with the present invention and the process of welding that valve 44 onto a layer 40. As with the prior art example, the valve 44 is made up of two components—a valve body 70, and an insert 81. In this case, the valve body 70 defines a cylindrical cavity 72 having a central axis 74. At one end 76 of the valve body 70 is a small diameter opening 76' having a diameter of about 2 mm. At the other end 78 of the cavity 72, the valve body 70 defines a large opening 78', having substantially the same diameter as the cavity 72. In this particular embodiment, the cylindrical cavity has a diameter of $5/16$". (The small opening 76' should be less than 40% of the diameter of the cylindrical chamber.) A flange 82 projects outwardly at the end 78.

A cylindrical valve insert 81, which is made of a softer material than the valve body 70, is inserted into the cylindrical cavity 72 through the large opening 78' prior to welding the valve body 70 to the layer 40 of thermoplastic material. As with the prior art insert 181, the "at rest" outside diameter of the insert 81 is larger than the inside diameter of the cavity 72, so the cavity body 72 radially compresses the insert 81. In this design, the insert extends the full height of the cavity 72, so there is no space between the end 76 and the insert 81.

Figure 21:
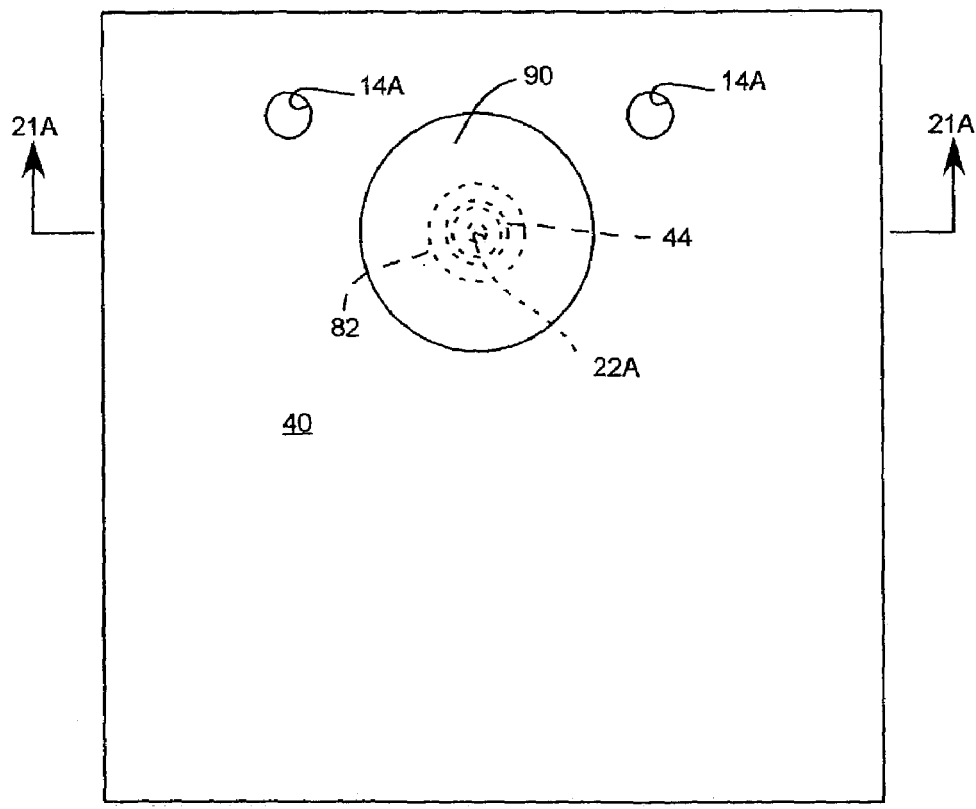
FIG. 21 is a plan view looking down on the upper die and the layer onto which a valve is to be welded, prior to the application of heat and pressure.
Figure 22:
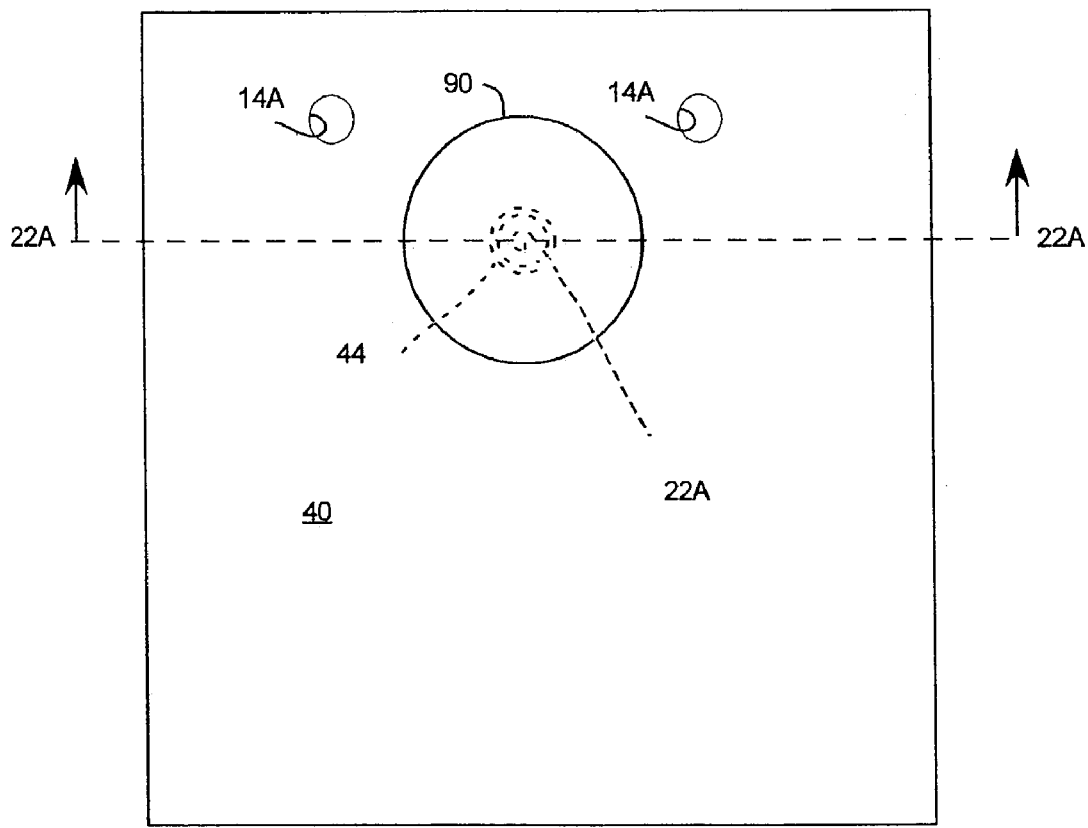
FIG. 22 is the same view as FIG. 21, but after the heat and pressure have been applied to weld the valve to the material.
Figure 23:
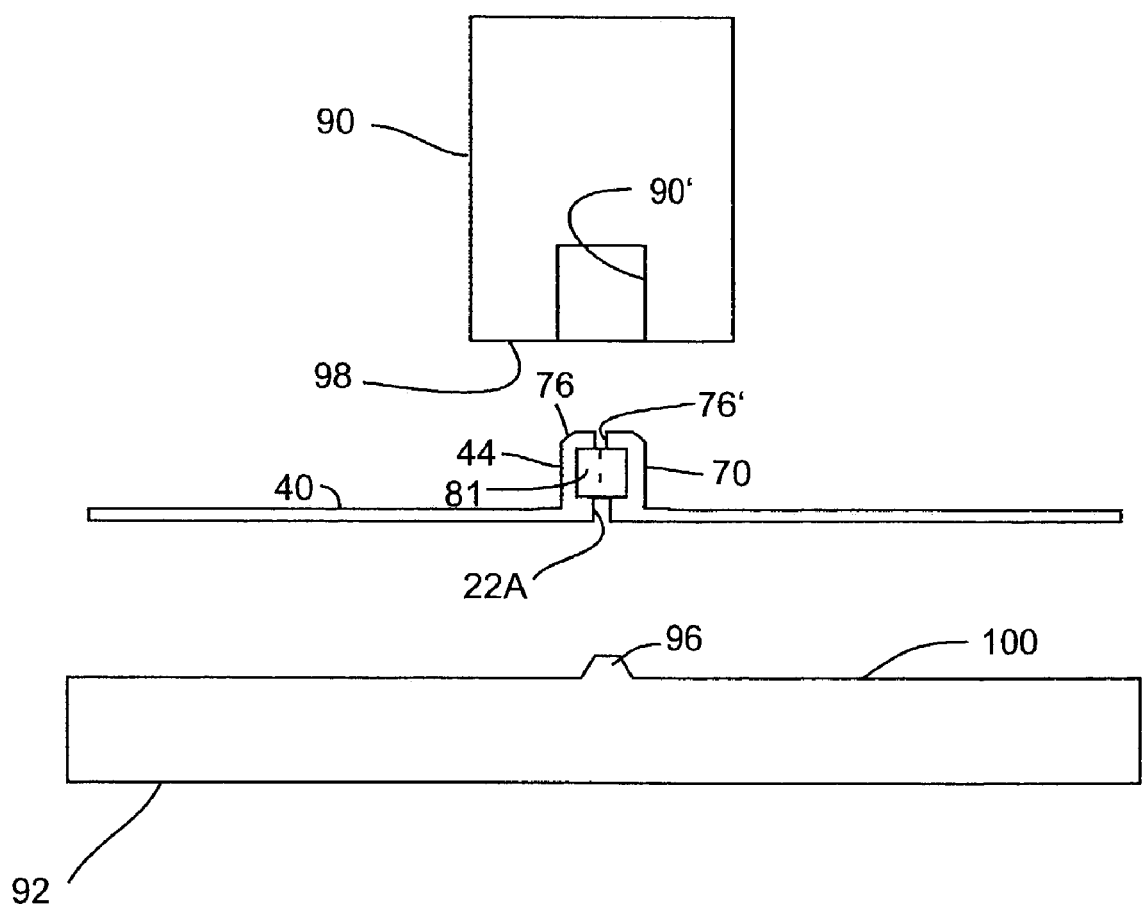
FIG. 23 is the same view as FIG. 22A, but with the dies separated after welding.

FIGS. 21–23 show the process for welding the valve 44 to the layer 40, which, as was explained earlier, is done prior to welding the two layers together. Upper and lower dies 90, 92 are used to apply pressure and heat to the valve flange 82 and to the layer 40 in order to weld the valve 44 to the layer 40. The upper die 90 has a cylindrical recess 90' that is slightly larger than the outside diameter of the valve body 70 but substantially smaller than the outside diameter of the flange 82, and the valve 44 is received in that recess 90'. The hole 22A is made in the layer 40 prior to welding, at the same time that the registration holes 14A are formed and has a diameter of 0.125 inches.

Figure 21A:
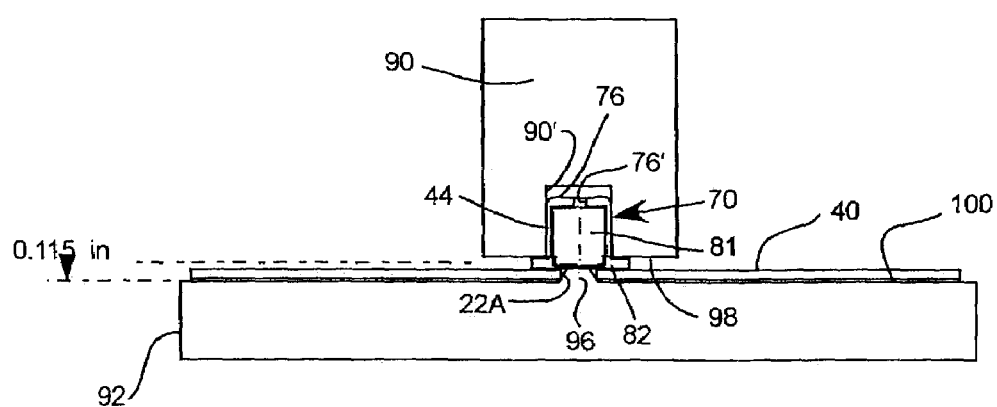
FIG. 21A is a schematic section view taken along the line 21A—21A of FIG. 21.
Figure 22A:
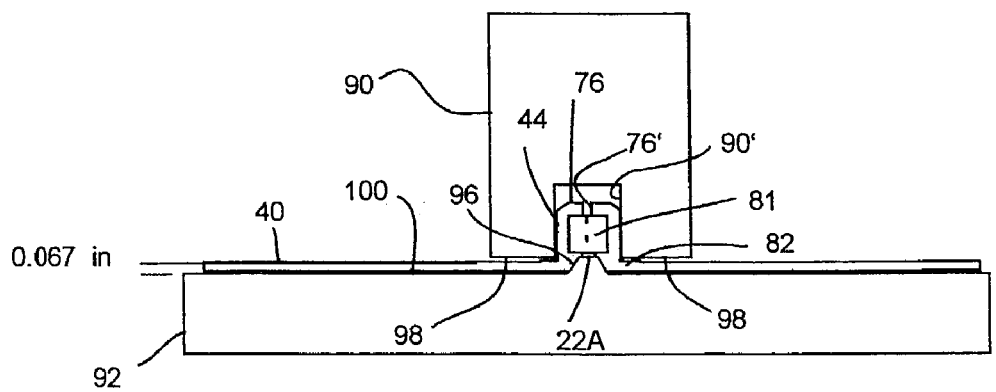
FIG. 22A is a schematic section view taken along the line 22A—22A of FIG. 22.

FIGS. 21 and 21A show the dies 90, 92, the valve 44, and the layer 40 prior to welding. Once the dies 90, 92 begin pressing against the flange 82 and the layer 40, radio frequency current is applied to the dies 90, 92. The material of the flange 82 and of the layer 40 in the gap between the weld surfaces 98, 100 are melted and merge together. The dies 90, 92 move toward each other, limited by pre-set limit stops (not shown), resulting in a final gap of just slightly greater than the original thickness of the layer 40, as shown in FIG. 22A. The valve body 70 and the layer 40 preferably are made of the same thermoplastic material, so they form a homogeneous welded bond, with no visible boundary. As an example of the amount of extrusion that typically occurs in this process, while the initial gap in this embodiment, as shown in FIG. 21A, is 0.115 inches (the total thickness of the flange 82 and the layer 40), the final gap, shown in FIG. 22A, is 0.067 inches, or just slightly thicker than the layer 40 itself.

As in the case of the extruded perimeter weld described earlier, the molten material of the valve flange 82 is extruded outwardly. It is prevented from flowing inwardly by the upward projection 96 from the lower die 92, which serves as a kind of dam.

FIG. 23 shows the valve 44 welded to the layer 40. The hole 22A through the layer material 40 provides the outer opening into the cylindrical chamber of the valve 44. Thus, instead of the opening from outside the layer 40 being an original part of the valve body, as in the prior art of FIG. 20A, it is formed by the layer material 40 when the valve 44 is welded to the layer 40. Either before or after the valve 44 is welded to the layer 40, a piercing tool is used to pierce an axial hole 75 through the insert 81. The piercing in this particular example is done using a 2.36 mm diameter needle that is heated to a temperature of 300–350 degrees F. and is lubricated with a silicone-based grease (dimethyl polysiloxane) sold by Dow Corning, which is compatible with the silicone rubber cord material of the insert 81. As with the prior art, the compressive force of the valve body 70 on the insert 81 keeps the pierced axial hole 75 closed while permitting a typical sports ball inflation needle having a typical diameter of 2 mm to be inserted through the hole 75 for inflating the product. It also may be desirable to lubricate the rounded outer surfaces of the valve body 70 that would contact the inside of the ball in order to reduce abrasion of the inside of the ball during use. This lubrication preferably would be done after the valve body 70 is welded to the layer 40 and before welding the layers 40, 42 together to form the ball, using the same lubricant used to lubricate the piercing needle. The hole 76' in the valve body has a diameter that is slightly larger than the 2 mm inflation needle. In this preferred embodiment, the layers 40, 42 and the valve body 70 are made of an ether-based polyurethane.

In the prior art, the inserts 81 are produced by injection molding in multi-cavity molds. This method creates variances in the shape of the insert at the parting line, which can create a problem. In this embodiment, the inserts 81 are formed by making a continuous extruded rod and then cutting that rod to the desired length. Since there are no parting lines in the extruded rod, the shape of the insert 81 is more consistent.

It should be noted that, since the insert 81 fills the entire height of the cylindrical cavity 72, any air pressure inside the final ball (or other inflatable product) will act against the insert 81 only over the area of the small hole 76', which has a diameter slightly larger than the diameter of an inflation needle 22. In the prior art design shown in FIG. 20A, the diameter of the opening 176' is much larger than the small hole 76', so, even if the insert filled the entire cavity, the same internal pressure would be acting over a larger surface area of the insert 181, thereby applying more force to the insert. However, in addition, since the prior art insert 181 is substantially shorter than the cavity 172 in which it is received, there is a space between the insert and the cavity. This means that the internal air pressure is really acting against the entire bottom surface of the insert 181. This is a much greater surface area, so the same internal pressure will apply a far greater force against the insert in the prior art design. In the prior art design shown in FIG. 20A, the outer opening 178' is made very small to prevent the valve insert 181 from popping out. However, in the present embodiment, since the surface area over which the internal pressure is acting is much smaller, and therefore the force acting on the insert is much less, the outer opening 22A can be much larger, which permits the insert to be removed and replaced from outside the sealed product, by moving the insert 81 through the outer opening 22A. Also, since the opening 22A is thinner and is made of the same material as the layer 40, the opening 22A can be stretched more easily, also helping with the removal and replacement of the insert 81.

It can also be seen in FIGS. 19 and 20 that the valve body 70 has a rounded outer surface 71 where its side walls merge with its bottom wall 76, which is less likely to abrade the interior of the ball and cause failure in that manner.

FIGS. 24–26 show a special type of ball 200 made in accordance with the present invention. This ball 200 includes an internal plenum 202, which divides the interior of the ball 200 into two chambers 204, 206, which communicate with each other through a small opening 208 in the plenum 202. The plenum 202 is formed simply by piercing an additional layer 240 of the same material as the layers 40, 42, folding that layer 240 along a line aligned with the opening 208, and placing that folded layer 240 between the two layers 40, 42 when they are welded together. This gives the ball 200 a double-layered lower wall portion and a single-layered upper wall portion. It makes a perimeter weld around the perimeter of the two outer layers 40, 42 and a perimeter weld around the perimeter of the two layers formed by the inner layer 240, both at the same time. Thus, part of the extruded weld bead 50 has two layers of material 40, 42, and part of the extruded weld bead 50 has four layers of material—including the layers 40, 42, and two layers of 240. In this embodiment, the weld bead 50 in the upper portion of the ball would have a tensile strength at least 50% of the wall from which it is formed (having the thickness of one of the layers 40, 42), and the weld bead 50 in the lower portion of the ball would have a tensile strength at least 50% of the wall in which it is formed (having the thickness of two layers 40& 240 or 42&240).

The purpose of the plenum 202 is to provide some internal damping within the ball 200, much as the balls provide internal damping inside the tire. For example, if the ball 200 has an abrupt, sharp impact, tending to compress it, the instantaneous high pressure will be felt in a smaller area, on one side of the plenum 202, not on the entire interior of the ball, which means that this ball will be less likely to collapse severely on an instantaneous impact, thereby providing greater protection to the tire rim at a given initial internal ball pressure.

Figure 27:
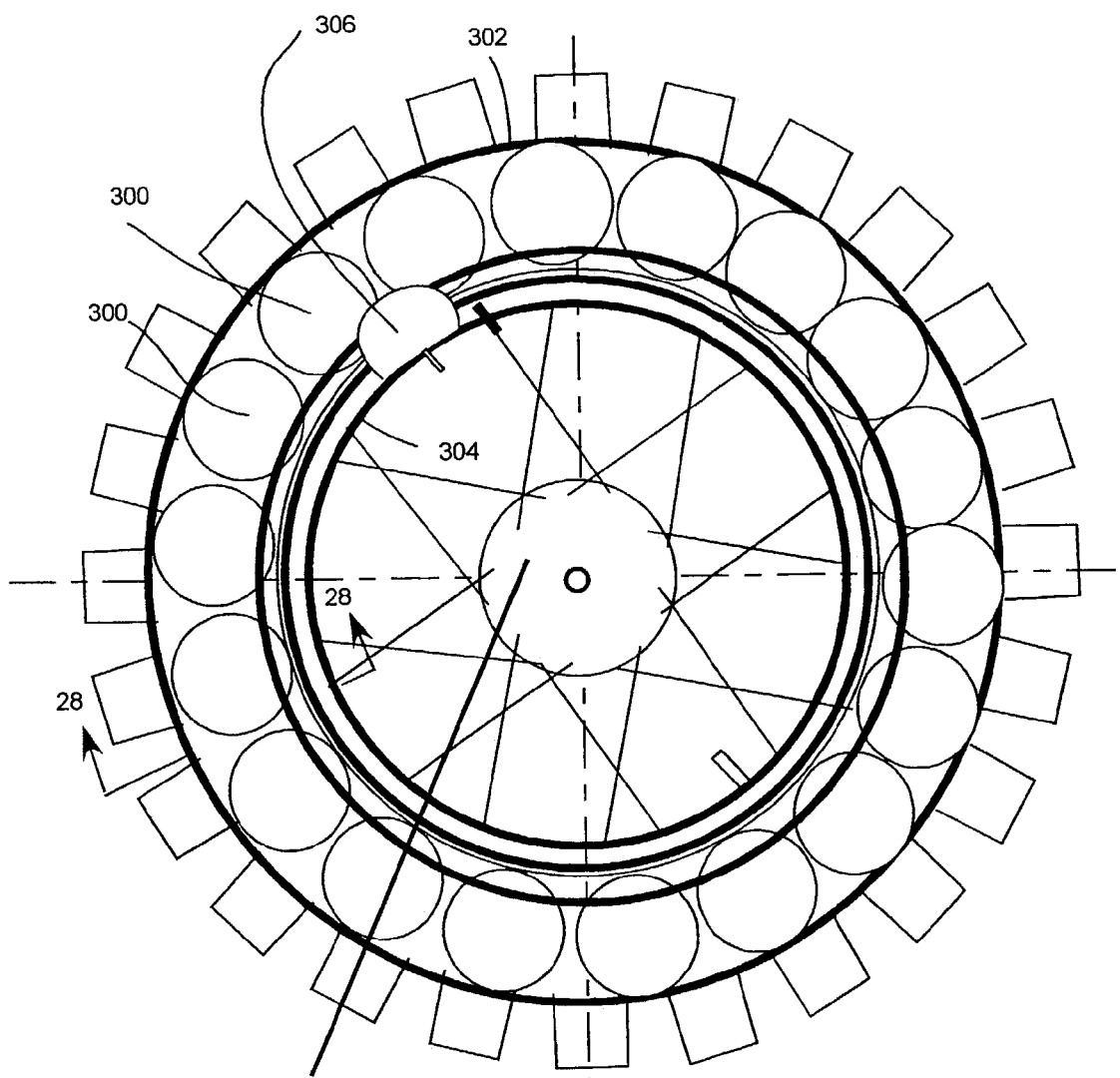
FIG. 27 is a schematic view of a tire using a plurality of balls made in accordance with the present invention.
Figure 28:
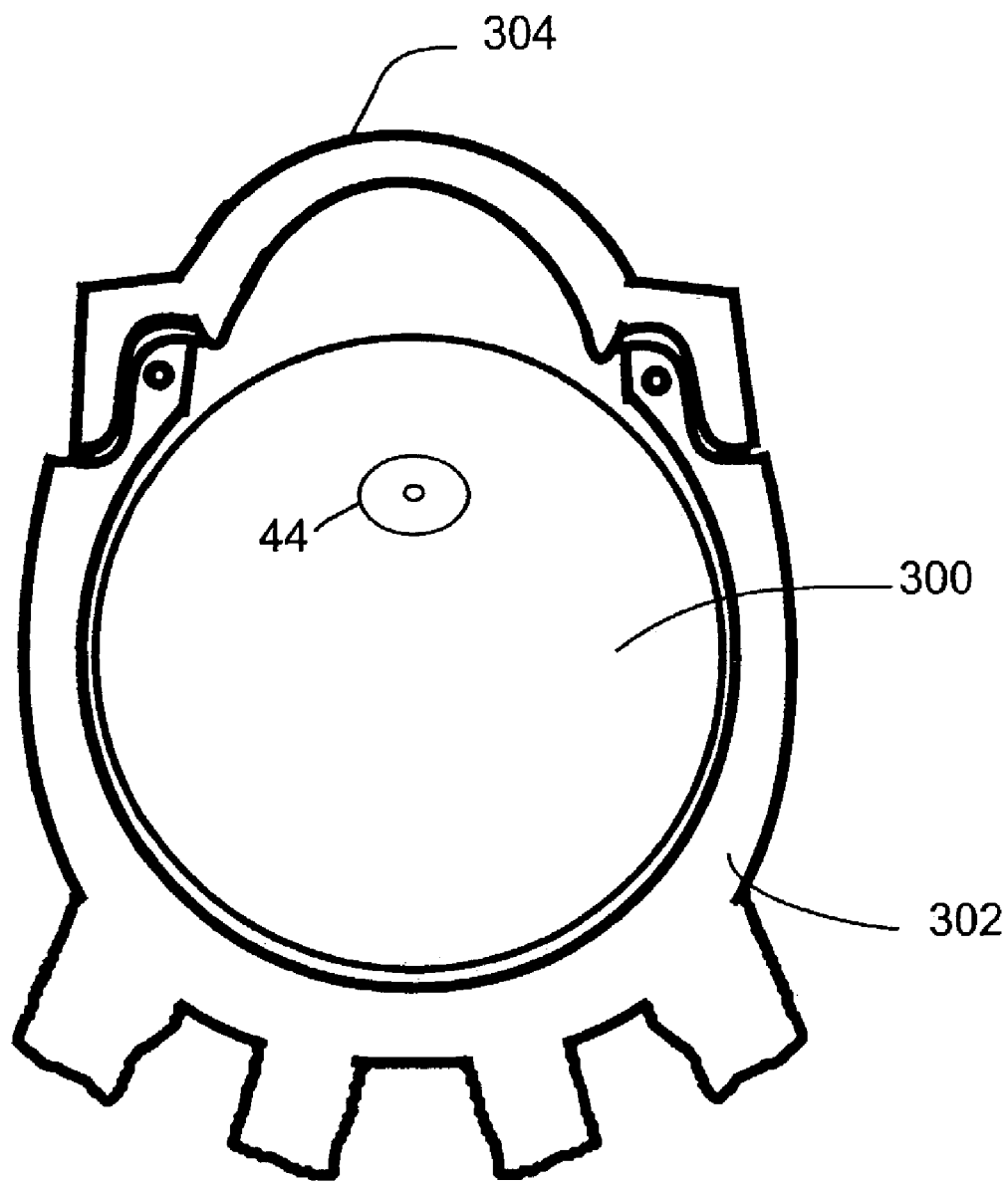
FIG. 28 is a view along the line 28—28 of FIG. 27.

FIGS. 27 and 28 are copied from U.S. patent application Ser. No. 09/879,709 and show a plurality of balls 300 inside a tire casing 302, between the tire casing 302 and the safety rim 304. Each ball 300 substantially fills the radial distance between the tire casing 302 and the rim 304. A rim lock 306 is used to lock the casing onto the rim and to prevent the balls 300 from shifting. The balls 300 may be any of the embodiments described in this application or obvious variations thereof in order to provide superior performance in the tire environment for off-road motorcycle tires than did the balls that were available at the time that previous patent application was filed.

The balls that have been successfully tested for off-road motorcycle use are made of an ether-based polyurethane layer that is 0.050 inches thick (50 mils). The diameter of these balls is from 2.5 to 4.5 inches, and they support 3000 pounds of force without exceeding their elastic or tensile limits and without stretching over 50% more than their initial surface area before they were placed under any load. One advantage of this material is that it is recyclable and can be remolded.

It is estimated that balls for automobile tires would be from four to eight inches in diameter and 30–100 mils thick, while able to support 25,000 pounds without exceeding elastic and tensile limits and without stretching beyond 150% of their initial surface area before loading.

In order to define the balls in more general terms, it is preferred that the balls be able to support a force in pounds that is at least one hundred times the cube of their diameter in inches without exceeding their tensile and elastic limits and without stretching beyond 150% of their initial surface area. Also, it is preferred that the wall thickness be less than 3% of the diameter, and more preferably less than 2% of the diameter. So, for example, for a ball that is three inches in diameter, it preferably should be able to support at least 2700 pounds (3×3×3×100) without exceeding its tensile and elastic limits and without stretching to more than 1500/o of its initial surface area. It preferably should also have a wall thickness less than 0.09 inches (3% of 3), and more preferably less than 0.06 inches (2% of 3). For a ball that is five inches in diameter, it preferably should be able to support at least 12,500 pounds (5×5×5×100) without exceeding its tensile and elastic limits and without stretching to more than 150% of its initial surface area. It preferably should also have a wall thickness less than 0.15 inches (3% of 5) and more preferably less than 0.10 inches (2% of 5).

The embodiments described above are meant as examples of products made in accordance with the present invention, not as an exhaustive description of every possible product that can be made within the scope of the present invention. It will be obvious to those skilled in the art that modifications may be made to the embodiments described above without departing from the scope of the present invention.

What is claimed is:

1. A method for welding together two layers of thermoplastic material, comprising the steps of:
    providing first and second opposed dies, each of said dies having a flat portion and defining a recess adjacent to said flat portion;
    placing at least two substantially flat layers of thermoplastic material between said first and second opposed dies, with the flat portions of the dies opposite each other and the recessed portions of the dies opposite each other;
    applying energy to said dies to melt the thermoplastic material between said dies;
    pressing said dies together to compress and reduce the thickness of the material between the flat portions of the dies at least 70%, thereby extruding some of the thermoplastic material into the recesses of said dies; and
    producing a weld that is at least 50% as strong as one of the layers of the thermoplastic material.

2. A method for welding together two layers of thermoplastic material as recited in claim 1, wherein said heating is achieved by applying radio frequency electrical energy to the dies, and wherein the opposed recesses in the first and second opposed dies are mirror images of each other.

3. A method for welding together two layers of thermoplastic material as recited in claim 1, and further comprising the step of causing the layers on the recessed side of the dies to be held apart from each other throughout during the extruding process.

4. A method for welding together two layers of thermoplastic material as recited in claim 3, wherein said flat surfaces and said recesses define the perimeter of an inflatable welded item; and
    wherein the layers are held apart by inflating the item.

5. A method for welding together two layers of thermoplastic material as recited in claim 1, wherein there is a projection from one of the dies that lies adjacent to the flat surface of its respective die and projects toward the other of the dies beyond a plane formed by the flat surface of its respective die and further damming the side of said flat portions opposite said recesses by using said projection in order to direct extruded material toward said recesses.

6. A method for welding together two layers of thermoplastic material as recited in claim 4, and further damming the side of said flat portions opposite said recesses in order to direct extruded material toward said recesses.

7. A method for welding together layers of thermoplastic material of uniform thickness to form an airtight, inflatable product, comprising the steps of:
    providing first and second opposed dies including opposed flat surfaces and opposed recesses adjacent to said opposed flat surfaces, so as to define the perimeter of the inflatable product;
    placing the substantially flat layers of thermoplastic material between said opposed dies;
    applying energy to melt the thermoplastic material between the opposed flat surfaces;
    injecting gas between said layers in order to hold the layers apart from each other within said perimeter; and
    pressing said dies together to reduce the thickness of the thermoplastic material between the flat surfaces at least 60% in order to extrude some of the melted material into the recesses.

8. A method as recited in claim 7, wherein there is a valve extending through one of said layers, and the step of injecting gas includes injecting gas through said valve.

9. A method as recited in claim 7, wherein said step of injecting gas occurs before the step of applying energy to melt the thermoplastic material, and wherein said gas pushes said extruded melted material against the recesses.

10. A method as recited in claim 4, wherein each of said dies also has a steeply tapered wall adjacent its respective recess, and including the step of pressing said layers against their respective steeply tapered walls while the energy is being applied.

* * * * *

UNITED STATES PATENT AND TRADEMARK OFFICE
CERTIFICATE OF CORRECTION

PATENT NO. : 7,005,025 B2
DATED : February 28, 2006
INVENTOR(S) : Summers

It is certified that error appears in the above-identified patent and that said Letters Patent is hereby corrected as shown below:

Column 11,
Line 13, delete "1500/o" and insert -- 150% --.

Signed and Sealed this

Eighteenth Day of April, 2006

JON W. DUDAS
*Director of the United States Patent and Trademark Office*